US009389875B2

(12) United States Patent
Thai et al.

(10) Patent No.: US 9,389,875 B2
(45) Date of Patent: Jul. 12, 2016

(54) SELECTABLE GRAPHICS CONTROLLERS TO DISPLAY OUTPUT

(71) Applicant: Hewlett-Packard Development Company, L.P., Houston, TX (US)

(72) Inventors: Thong Thai, Houston, TX (US); Baraneedharan Anbazhagan, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 13 days.

(21) Appl. No.: 14/415,164

(22) PCT Filed: Sep. 28, 2012

(86) PCT No.: PCT/US2012/058021
§ 371 (c)(1),
(2) Date: Jan. 16, 2015

(87) PCT Pub. No.: WO2014/051622
PCT Pub. Date: Apr. 3, 2014

(65) Prior Publication Data
US 2015/0205616 A1    Jul. 23, 2015

(51) Int. Cl.
*G06F 15/167*    (2006.01)
*G06F 9/44*    (2006.01)
*G06F 9/46*    (2006.01)

(52) U.S. Cl.
CPC ............ *G06F 9/4401* (2013.01); *G06F 9/4411* (2013.01); *G06F 9/463* (2013.01)

(58) Field of Classification Search
None
See application file for complete search history.

(56) References Cited

U.S. PATENT DOCUMENTS

| 5,799,204 | A | 8/1998 | Pesto, Jr. |
| 6,272,627 | B1 | 8/2001 | Mann |
| 6,304,244 | B1 | 10/2001 | Hawkins et al. |
| 6,963,344 | B1 | 11/2005 | Kasprzak et al. |
| 6,964,054 | B1 | 11/2005 | Laviolette et al. |
| 2003/0065850 | A1 | 4/2003 | Saw-Chu et al. |
| 2003/0065914 | A1 | 4/2003 | Saw-Chu et al. |
| 2010/0164968 | A1 | 7/2010 | Kwa et al. |
| 2010/0245366 | A1 | 9/2010 | Nath |
| 2012/0154375 | A1* | 6/2012 | Zhang ................... G06F 9/4411 345/419 |

FOREIGN PATENT DOCUMENTS

KR    10-2003-0046000 A    6/2003

OTHER PUBLICATIONS

"PC Engines tinyBIOS," Version 1.3c, Apr. 13, 2001; 38 pages; <http://www.pcengines.ch/pdf/tb13.pdf>.

* cited by examiner

*Primary Examiner* — Martin Mushambo
(74) *Attorney, Agent, or Firm* — HPI Patent Department

(57) ABSTRACT

A computing system includes a plurality of graphics controllers, a reserved memory region, a shadow memory region, and a system Basic Input Output System (BIOS). The reserved memory region is to store a plurality of video Basic Input Output System (BIOS) images. The shadow memory region is to store a selected video BIOS image corresponding to a selected graphics controller, such that the selected graphics controller is to display output in response to a service request for video BIOS services, without use of a graphics driver. The system BIOS is to enable changing the selected graphics controller, based on copying a video BIOS image from the reserved memory region to the shadow memory region.

15 Claims, 9 Drawing Sheets

SELECTABLE GRAPHICS CONTROLLERS TO DISPLAY OUTPUT

BACKGROUND

A computing system may include multiple graphics controllers, for example a switchable graphics or hybrid graphics computing system having an integrated graphics processing unit (GPU) and a discrete CPU. A graphics controller may be connectable to a display and associated with a video driver. Prior to starting the video driver associated with the graphics controller, or when a video driver is not available, video Basic Input Output System (BIOS) services may be used to output images to a display connected to the associated graphics controller.

BRIEF DESCRIPTION OF THE DRAWINGS/FIGURES

DETAILED DESCRIPTION

Figure 1:
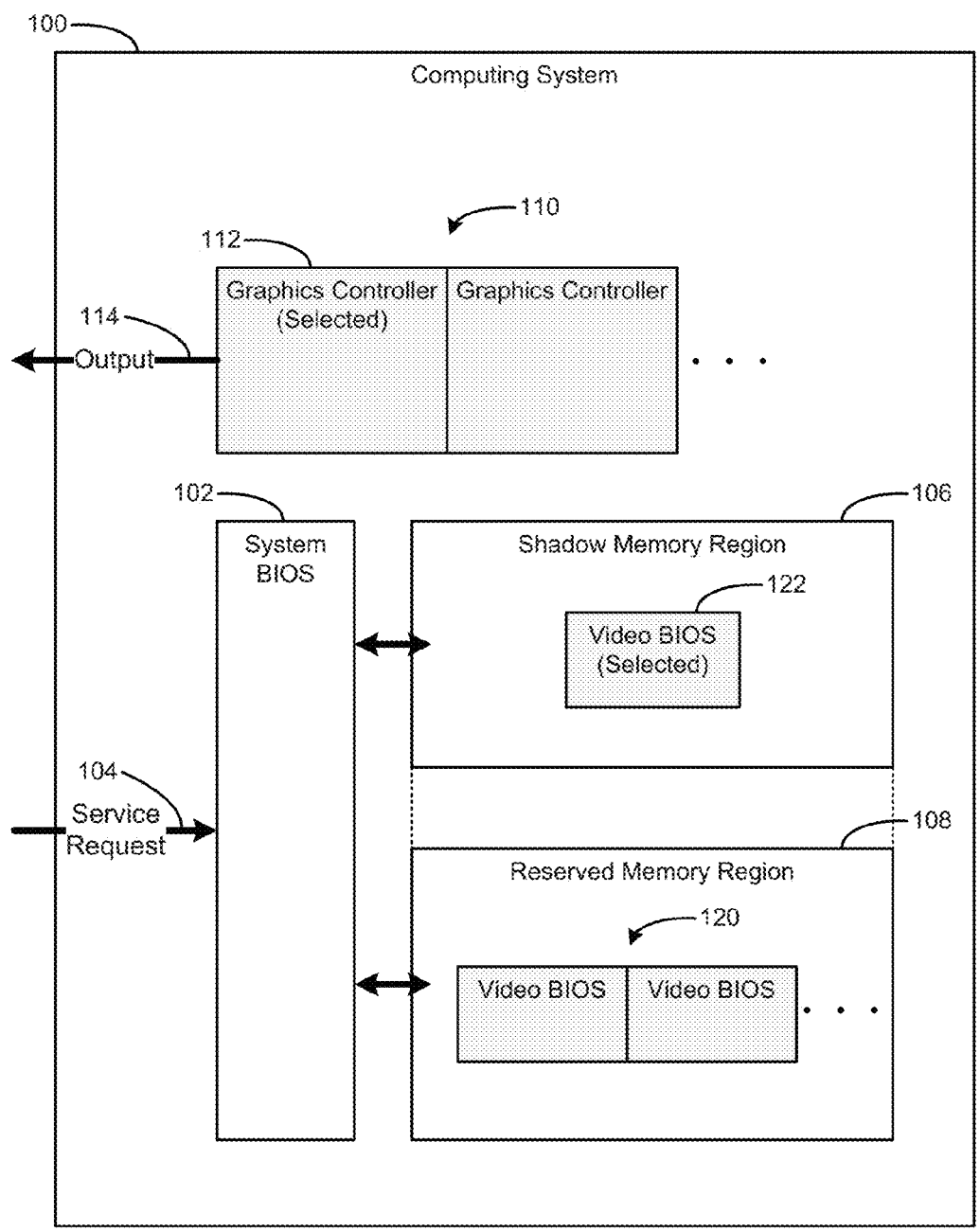
FIG. 1 is a block diagram of a computing system including a plurality of graphics controllers according to an example.

A computing system having multiple graphics controllers, i.e., graphical processing units (GPUs), may use video drivers to provide output to displays that are connected to the graphics controllers. An example switchable i.e., hybrid, graphics system may have one GPU integrated with a central processing unit (CPU) of the computing system, referred to as an integrated GPU (iGPU). The computing system may have another GPU (e.g., coupled to a high speed bus), referred to as a discrete GPU (dGPU). In alternate examples, the computing system may include multiple graphics controllers beyond the two mentioned here. A display may be attached to either of the GPUs. However, a display attached to the dGPU may not be available for use during boot up or prior to starting an operating system (OS) and/or software video driver for the dGPU. For example, the iGPU may be initialized for video services, whereas the dGPU is unavailable prior to the OS starting. Even after the OS starts, if a graphics driver is not available, or if it has been disabled, the dGPU display may not be usable. Thus, with multiple graphics controllers, a display and/or graphics controller may be unusable for video BIOS services, causing user frustration and confusion if the computing system is operated in a mode where a video driver is not loaded (e.g., during password entry prior to starting an operating system).

When a video driver is not available, a computing system may rely on video Basic Input Output System (BIOS) services. The video BIOS may provide video-related services that are used by a system to access the video hardware of a video controller, enabling an interface between software associated with a computing system and hardware associated with a video controller. Video BIOS services may enable output for a graphics controller that has been dispatched (enabled for video BIOS services). In a computing system, one graphics controller is dispatched and available for video BIOS services. In an example notebook computing system having an internal panel display, an iGPU may drive the internal panel display and a Video Graphics Array (VGA) output. Thus, the video BIOS corresponding to the iGPU may be dispatched, for providing video BIOS services for the internal panel display and/or the VGA output. However, such an example system may not support output to a display attached to the discrete graphics controller (dGPU), in the absence of a video driver for the dGPU.

Accordingly, in the example hybrid system described above, graphics controllers other than the iGPU may be unusable when display output is desired and the display driver is unavailable. The issue increases as the number of graphics controllers increases (e.g., on a multi-display computing system for displaying stock market information, for enthusiast gaming, or other applications using multiple graphics controllers and multiple displays).

Video BIOS services may be used to display output for a graphics controller when a display driver is not active. However, in addition to posting/dispatching one primary graphics controller, example computing systems having multiple graphics controllers may post video BIOSes for more than one (e.g., all) graphics controllers. A graphics controller to be used may be switched on-the-fly into a memory region for use with video BIOS services. From an OS and/or an application's perspective, video BIOS services are being provided. Video BIOS services may be provided from the perspective that a primary graphics controller is being used, even though multiple graphics controllers may be supported. The video BIOS services may be provided to an OS/application, without a need for the OS/application to be customized to interact with underlying lower-level techniques involved in enabling support for multiple graphics controllers. Thus, example computing systems may swap back and forth between various dispatched video BIOSes to support multiple graphics controllers and connected displays, while supporting OS/application calls to a primary graphics controller from the perspective of providing video BIOS services.

FIG. 1 is a block diagram of a computing system 100 including a plurality of graphics controllers 110 according to an example. The computing system 100 also includes system Basic Input Output System (BIOS) 102, shadow memory region 106, and reserved memory region 108. The shadow memory region 106 is associated with a selected video BIOS 122, corresponding to the selected graphics controller 112. The reserved memory region 108 is associated with a plurality of video BIOSes 120. The selected graphics controller 112 is to provide output 114, e.g., in response to service request 104.

The computing system 100 may provide output 114 from the plurality of graphics controllers 110, such as output from discrete graphics on a switchable/hybrid graphics system when a video driver is not available. The reserved memory region 108 is to store the plurality of video BIOS images 120, and the shadow memory region 106 is to store a selected video BIOS image 122 corresponding to the selected graphics controller 112, such that the selected graphics controller 112 is to display output 114 in response to a service request for video BIOS services, without using a graphics driver. The system BIOS 102 is to enable changing the selected graphics controller 112 from the plurality of graphics controllers 110, based on copying a video BIOS image from the reserved memory region 108 to the shadow memory region 106. As set forth herein, the terms "video BIOS" and "video BIOS image" are used interchangeably. Furthermore, references to BIOS may be interpreted to refer generally to interlaces between software and hardware, between an operating system and platform firmware, and other interfaces, and may include boot firmware or other examples such as a Unified Extensible Firmware Interface (UEFI).

In an example, at system boot up, a video BIOS for a graphics controller may be dispatched, and copied into the reserve memory region 108. Thus, the plurality of video BIOSes 120 may be contained in the reserved memory region 108. Each video BIOS may be dispatched in series, enabling the system BIOS 102 to identify various additional aspects of the video BIOS during its dispatching (e.g., identify an associated interrupt offset when each video BIOS is dispatched). In alternate examples, the plurality of video BIOSes 120 may be dispatched in parallel. The computing system 100 may dispatch the selected video BIOS 122 last, such that the selected video BIOS 122 remains in the shadow memory region 106. In alternate examples, the computing system 100 may swap the selected video BIOS 122 into the shadow memory region 106, independently of how the plurality of video BIOSes 120 were dispatched (e.g., in a specific sequence, in parallel, etc.). Example computing systems 100 may place the selected video BIOS 122 in the shadow memory region 106 in response to system boot up. Example computing systems 100 also may place the selected video BIOS 122 in the shadow memory region 106 in response to a display connect status change and/or when processing a request for video BIOS services. For example, a first display used for output 114 may be disconnected from the selected graphics controller 112, and a second display may be connected to another one of the plurality of graphics controllers 110. The computing system 100 may then replace the selected video BIOS 122, in the shadow memory region 106, with another one of the plurality video BIOSes 120 corresponding to the now-connected graphics controller. The system BIOS 102 may enable the computing system 100 to interpret display changes and selection of graphics controllers and/or video BIOSes, as well as enable other system functionality independently of an OS being loaded.

Dispatching, which also may be referred to as POSTing (Power On Self-Test), may be used to place the selected video BIOS 122 into the shadow memory region 106. A video BIOS image from a graphics vendor may be available in a compressed format, e.g., stored in non-volatile memory of a graphics controller. Dispatching may take that image and uncompress it to a temporary location. The computing system 100 (e.g., system BIOS 102) may execute code in the uncompressed video BIOS image to set up the graphics hardware corresponding to the particular video BIOS. As part of the dispatching process, the executed image can rewrite itself into the shadow memory region 106 as a complete post image of the video BIOS (e.g., the selected video BIOS 122). Dispatching may also involve initializing the video controller hardware corresponding to the video BIOS.

The selected video BIOS 122, after executing/posting/dispatching it, may reside in a particular location associated with service request 104. For example, dispatching the selected video BIOS 122 may cause it to reside at an offset from memory location C0000. Thus, requests to use video resources according to video BIOS (e.g., service request 104) may be directed to the stored location of the video BIOS 122 based on an offset from the C0000 memory location to execute code. In an example computing system, the memory location associated with the shadow memory region 106 may hold one video BIOS image.

The computing system 100 may dispatch the plurality of graphics controllers 110, by setting up a POST image (i.e., dispatching) for each graphics controller, and copying the dispatched video BIOS image to the reserved memory region 108 (repeat for each video BIOS) to achieve the plurality of video BIOSes 120 stored in the reserved memory region 108. Thus, the shadow memory region 106 and the reserved memory region 108 may be set up to allow switching, on-the-fly, which of the video BIOS images is stored in the shadow memory region 106 as the selected video BIOS 122.

Which of the dispatched video BIOSes to use may be based on display availability, and may be made based on a policy decision (e.g., based on a priority associated with an output port of a graphics controller). For example, if one display available for output 114 is attached to a discrete graphics controller (dGPU), the computing system 100 (e.g., under control of system BIOS 102) can copy the dispatched video BIOS, stored in the reserved memory region 108, up to the shadow memory region 106 (e.g., the C0000 location). Thus, service requests 104 would actually call into the discrete graphics controller under the direction of its associated selected video BIOS 122, resulting in output 114 to the display that is attached to the discrete graphics controller. If the available display connected to another (e.g., integrated) graphics controller, then the computing system 100 may copy the corresponding integrated graphics controller video BIOS into the shadow memory region. The technique is extendable to all of the plurality of graphics controllers 110 and their associated plurality of video BIOSes 120. The computing system 100 may swap the selected video BIOS 122 in the background, such that other functions of the computing system 100 (e.g., the OS) do not need to be aware of, or customized to effect, the swapping.

Accordingly, the computing system 100 may display output 114 in desired situations where the display driver is unavailable. Such situations may include: booting into Microsoft® Windows 7® safe mode, using a basic graphics adapter from an OS independent hardware video graphics adapter (IHVG), during POST of the computing system, while booting to Windows (e.g., while a notebook lid is closed and an external digital display is connected to a dGPU), during an error in Windows® that stops the video driver and displays a so-called "blue screen of death" (BSOD), using a standard VGA driver, or exploiting other basic limitations when the display drivers are not active for personal computer (PC) architectures running OSes that use video BIOS services, such as Windows 7® and earlier OSes.

The system BIOS 102 may enable the computing system 100 to perform various functions. The system BIOS 102 may provide control to start the execution of the video BIOS image, e.g., jumping to a specific offset for the video BIOS. The system BIOS 102 may enable the video BIOS to be executed to identify how much memory space is needed. For example, suppose a video BIOS to be executed (such as after being uncompressed) is 92 Kilobytes (Kb) in size. The system BIOS 102 can execute the video BIOS and determine that, for the initial execution, a temporary space is to be allocated to fit that video BIOS. After execution completes (along with other processes involved in dispatching), the system BIOS 102 may allocate the shadow memory region 106 for accommodating the video BIOS 122 and any associated information (e.g., an interrupt offset for selected video BIOS 122). For example, the dispatched selected video BIOS 122 may occupy 50 Kb as its final size. The system BIOS 102 may identify a maximum size, to accommodate each of the plurality of video BIOSes 120, and allocate an appropriate memory space for dispatching each of the plurality of video BIOSes 120. The system BIOS 102 similarly can allocate space in the reserved memory region 108, or other memory regions of the computing system 100 (such as a temporary memory region, not shown). The system BIOS 102 also may be involved in initializing graphics controller hardware.

The video BIOSes may be copied/swapped based on techniques for copying from one memory location to another in the computing system 100 (e.g., central processing unit (CPU) memory management). For example, the CPU may copy a video BIOS to a one-megabyte low memory region for code execution.

In another example computing system 100, the plurality of graphics controllers 110 may include an Intel® integrated graphics controller and an NVidia® discrete graphics controller. The Intel® integrated graphics controller's video BIOS may be dispatched and the shadow memory region 106 would be updated to have a final image of the selected Intel® video BIOS 122. An interrupt offset (e.g., a location offset from a C0000 location of the shadow memory region 106) may be updated to enable execution of code in the selected video BIOS 122 in response to service requests 104 (e.g., interrupt requests that jump to the selected video BIOS 122 and start executing its code). After establishing the dispatched selected video BIOS 122 and associated interrupt offset, that information may be saved to the reserved memory region 108. Following the dispatching and saving of the video BIOS 122 for the Intel® integrated graphics controller, a similar procedure may be performed for the discrete NVidia® graphics controller, causing the selected video BIOS 122 to correspond to the Nvidia® graphics controller as a result of dispatching it, without specifically needing to copy it from the reserved memory region.

Thus, the reserved memory region 108 contains a so-called "snapshot" of the dispatched video BIOS 122 and associated information (interrupt offset etc.). The reserved memory region 108 may be protected/reserved to store the plurality video BIOSes 120, such that the reserved memory region 108 is prevented from being overwritten by an OS operating on the computing system 100. The reserved memory region 108 may be allocated to have an arbitrary size, and its final size may be allocated based on a combined size of the plurality of video BIOSes 120. The reserved memory region 108 may be sized to contain non-active video BIOSes.

Active and non-active video BIOSes may be selected based on system boot up, display status change, and what displays are attached or disconnected. In an example, at system boot up, the system BIOS 102 may dispatch each of the plurality of video BIOSes 120 for the plurality of graphics controllers 110 in sequence. After each video BIOS completes its dispatching, the dispatched video BIOS image in the shadow memory region 106 is saved to the reserved memory region 108 along with an associated interrupt offset. In response to a display connection status (e.g., a change in display connection status), system BIOS 102 may determine which of the plurality of video BIOSes 120 is to be the selected video BIOS 122 for processing service requests 104. The video BIOS that is selected is loaded into the shadow memory region 106 and the computing system 100 is updated for a corresponding interrupt offset for accessing the selected video BIOS 122.

Figure 2:
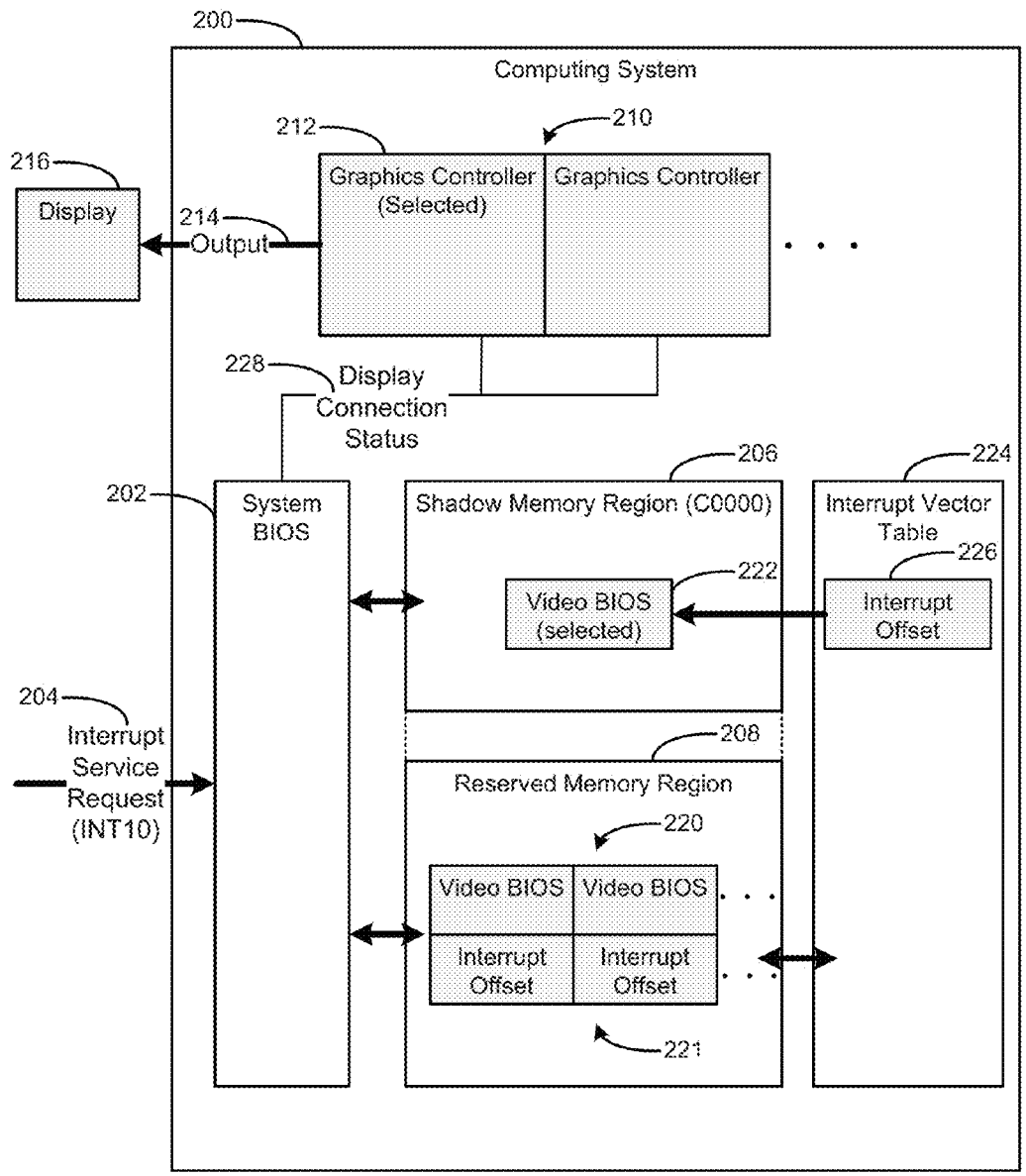
FIG. 2 is a block diagram of a computing system including a plurality of graphics controllers according to an example.

FIG. 2 is a block diagram of a computing system 200 including a plurality of graphics controllers 210 according to an example. The computing system 200 also includes system BIOS 202, shadow memory region 206, reserved memory region 208, and interrupt vector table 224. The system BIOS 202 is to identify a display connection status 228 associated with the plurality of graphics controllers 210. The shadow memory region 206 is associated with selected video BIOS 222, corresponding to the selected graphics controller 212. The reserved memory region 208 is associated with a plurality of video BIOSes 220 and corresponding plurality of interrupt offsets 221. The interrupt vector table 224 includes a selected interrupt offset 226, corresponding to the selected video BIOS 222 in the shadow memory region 206. The selected graphics controller 212 is to provide output 214 to display 216, e.g., in response to interrupt service request 204.

The selected video BIOS 222 may be dispatched, or copied from the reserved memory region 208, to the shadow memory region 206. The shadow memory region 206, also referred to as an active video BIOS region, is to store the selected video BIOS 222. System BIOS 202 may dynamically allocate and reserve shadow memory region 206 starting at a C0000 memory location. The allocated space may be sized to be equal to the largest dispatched video BIOS size corresponding to the plurality of video BIOSes 220.

In example computing system 200, the memory location C0000 is a general location for where a video BIOS image may exist, associated with the shadow memory region 206. The shadow memory region 206 may extend to other memory regions, such as a memory region associated with memory location D0000, and so on, for example.

The interrupt offset 226 may be an offset from the C0000 location of the shadow memory region 206. The particular offset value may be different for each video BIOS, and a different offset (plurality of interrupt offsets 221) may be stored in the reserved memory region 208 corresponding to the plurality of video BIOSes 220. An application or OS, associated with computing system 200, may request to use video BIOS services based on an INT10 interrupt service request 204 routine. The interrupt offset 226 allows the computing system 200 (e.g., system BIOS 202) to know where control should jump in order to start executing the video BIOS services for a selected video BIOS 222.

The interrupt offset 226 may be a single entry in the Interrupt Vector Table 224, and may be associated with a constellation of sub functions for a given video BIOS. Values for the interrupt offset 226, and/or associated sub functions, may differ for each display, and may be stored and updated for each display, including when there is display status change or other change to affect the interrupt offset 226 or associated functions/information.

The interrupt vector table 224 may be updated as part of the dispatching procedure, for example, to store the associated interrupt offset 226 (e.g., store the INT10 offset into the interrupt vector table 224). Dispatching the selected video BIOS 222 may involve writing, into the interrupt vector table 224, an INT10 offset for that selected video BIOS 222. Thus, if a plurality of video BIOSes are dispatched, the interrupt vector table 224 may be updated accordingly (e.g., a sequence of interrupt offsets 226 may be stored in the interrupt vector table 224 corresponding to a sequence of dispatches). System BIOS 202, or other hardware such as a graphics controller, may update the interrupt offset 226 stored in the interrupt vector table 224. The selected video BIOS 222 also may update the interrupt offset 226 directly.

The interrupt vector table 224 may enable interrupt mapping. Interrupt mapping provides flexibility to the computing system 200, enabling system BIOS 202 or other aspects of computing system 200 to have flexibility in making policy decision as to how a graphics controller is to be selected and/or prioritized among other graphics controllers. Example computing systems may take advantage of various forms of interrupt mapping, including a table in system BIOS 202, providing flexibility to implement changes on an as-needed basis, and providing different example computing systems 200 with different policies.

The decision to swap the selected video BIOS 222 (e.g., replace with one of the plurality of video BIOSes 220) may be based on which displays are attached to which of the plurality of graphics controllers 210. Hardware of the computing system 200 may be used to collect information to enable awareness of what displays are attached, and that information may be provided to the system BIOS 202. For example, a technique referred to as Display Hot Plug Detection (HPD) enables hardware such as a graphics controller to hardware-detect whether a display is connected and/or disconnected. The system BIOS 202 is able to obtain the HPD detection information from the hardware (e.g., as display connection status 228), and based on that information, computing system 200 (e.g., system BIOS 202) may make a decision as to which of the video BIOSes is to be used (e.g., by copying the selected video BIOS to the C0000 location of the shadow memory region 206, and/or by dispatching the selected video BIOS last, during boot up, so that it remains in the shadow memory region 206).

Display connection status 228 may be detected by conducting a check on current display status, and/or may be detected based on identifying a display status change, such as by receiving a hardware-based interrupt. For example, plugging-in a display to a graphics controller may trigger a display connection interrupt that may be received by the system BIOS 202 (or other portion of the computing system 200). Hardware and system BIOS 202 of computing system 200 may keep track of what displays are connected and/or disconnected, and keep track of when display status has changed. When there is a display change, computing system 200 may copy, from the reserved memory region 220, a corresponding one of the plurality of video BIOSes 220 to the C0000 location of the shadow memory region 206. The computing system 200 similarly may update the interrupt offset 226 stored in the interrupt vector table 224, by copying, to the interrupt vector table 224, the corresponding interrupt offset from the plurality of interrupt offsets 221. Thus, INT10 interrupt service requests 204 for video BIOS services will properly jump to the selected video BIOS 222 corresponding to connected display 216, based on the corresponding updated interrupt offset 226. If a plurality of displays are connected to the plurality of graphics controllers 210, the computing system 200 may implement policies to determine which video BIOS to select, such as using priorities among the various different graphics controllers 210 and available outputs 214 associated with the graphics controllers 210. The state of connected displays may be read (e.g., by system BIOS 202) through, e.g., a General Purpose Input/Output (GPIO) that indicates display connect status via HPD for digital display, via lid state for an internal panel, via a GPIO attached to a cable ground for VGA display, via internal graphics controller registers that represent display connect status, or other techniques for obtaining display connect status and/or change.

The computing system 200 (e.g., system BIOS 202) may develop a mapping of connectable displays 216. The display mapping may be associated with a corresponding Video BIOS and/or graphics controller responsible for outputting images to each of those displays. The display mapping may include information for each of the plurality of video BIOSes 220. The display mapping may be created and stored in system BIOS 202. The display mapping may be used by system BIOS 202 to determine which video BIOS is to be selected to handle INT10 interrupt service requests 204 for video BIOS services. The display mapping may be predefined, created, and stored in system BIOS 202. For example, a notebook computer may include an integrated graphics controller and discrete graphics controller each having various display outputs. The notebook computer may have a system BIOS including a display mapping to determine which of the various outputs of the graphics controllers to prioritize when display(s) are connected.

Thus, in response to a display state change (display being connected or disconnected, e.g., based on display connection status 228), hardware may detect the change and send an interrupt for system BIOS 202 to handle. System BIOS 202 may read the state of displays, and based on that data, determine which video BIOS should be chosen. If the chosen video BIOS is not already in the shadow memory region (e.g., based on dispatching the chosen video BIOS), system BIOS 202 may copy the chosen video BIOS over to the shadow memory region 206 as the selected video BIOS 222. System BIOS 202 also may update the interrupt vector table 224 with the selected interrupt offset 226 for handling INT10 requests for video services by using the selected video BIOS 222.

Figure 3:
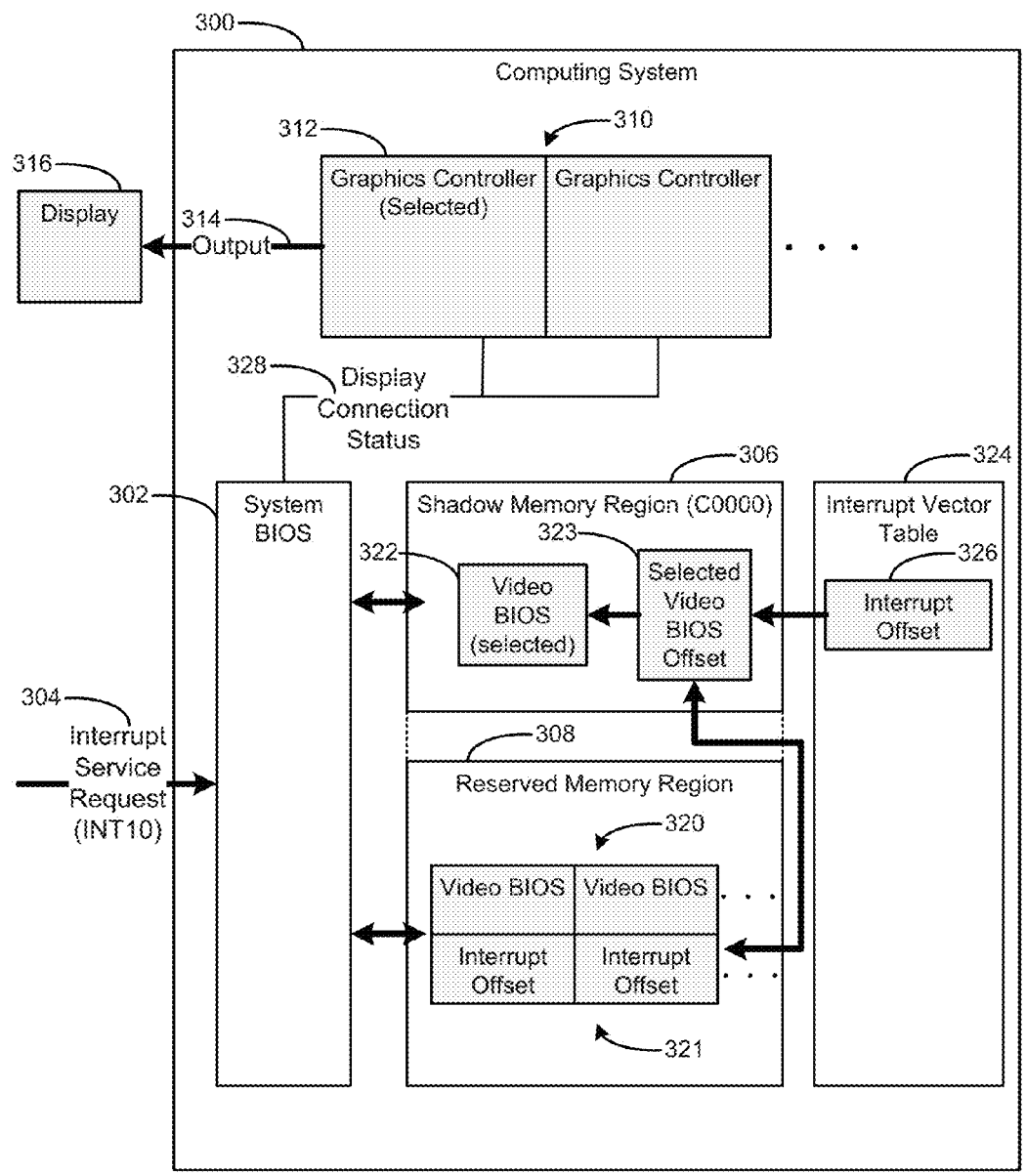
FIG. 3 is a block diagram of a computing system including a plurality of graphics controllers according to an example.

FIG. 3 is a block diagram of a computing system 300 including a plurality of graphics controllers 310 according to an example. The computing system 300 also includes system BIOS 302, shadow memory region 306, reserved memory region 308, and interrupt vector table 324. The system BIOS 302 is to identify a display connection status 328 associated with the plurality of graphics controllers 310. The shadow memory region 306 is associated with selected video BIOS 322, corresponding to the selected graphics controller 312. The shadow memory region 306 is also associated with selected video BIOS offset 323, which points to the selected video BIOS 322. The reserved memory region 308 is associated with a plurality of video BIOSes 320 and corresponding plurality of interrupt offsets 321. The interrupt vector table 324 includes interrupt offset 326, which points to the selected video BIOS offset 323 in the shadow memory region 306. The selected graphics controller 312 is to provide output 314 to display 316, e.g., in response to interrupt service request 304.

The selected video BIOS offset 323 in system memory (e.g., in shadow memory region 306) points to the selected video BIOS 322. The system BIOS 302 may enable changing the selected graphics controller 312 based on copying a corresponding interrupt offset 321 from the reserved memory region 308 to the selected video BIOS offset 323. The selected video BIOS offset 323 may, in turn, point to the selected video BIOS 322 for providing video services. Thus, the selected graphics controller 312 may be responsive to an interrupt service request 304 for video BIOS services, by way of the selected video BIOS offset 323 that may be updated accordingly, without a need to update the interrupt offset 326 (e.g., without changing the INT10 offset) in the interrupt vector table 324. Accordingly, a computing system 300 may utilize the same INT10 offset and not modify the interrupt vector table 324, while enabling changing of which video BIOS 322 and associated graphics controller 312 is selected.

The selected video BIOS offset 323 may be implemented as a jump command (e.g., JMP) or other technique to redirect requests to the interrupt offset 326 to the currently selected video BIOS 322. Thus, changes to the selected video BIOS offset 323 may be made to cause a redirect, without a need to change the interrupt vector table 324 or its interrupt offsets 326. In an example, the computing system 300 (e.g., system BIOS 302) may initially modify the interrupt offset 326 (e.g., at/during/following boot up) to point to the selected video BIOS offset 323. Accordingly, the interrupt offset 326 may remain pointing at the selected video BIOS offset 323, e.g., when an operating system (OS) loads. The selected video BIOS offset 323, however, may be dynamically updated to refer to the selected video BIOS 322, tracking changes to the corresponding graphics controller 312 that has been selected and/or changed. The interrupt offset 326 may point to an earliest offset of the shadow memory region 306, e.g., memory location C0000. The video BIOSes may be loaded so that the largest video BIOS corresponds to the memory location C0000, and other smaller video BIOSes are loaded into higher memory regions (e.g., to avoid overwriting any portions of the other video BIOSes when the selected video BIOS 322 is overwritten).

Thus, the example of FIG. 3 may be compatible with operating systems where the interrupt offset 326, (e.g., interrupt vector table 324) is not changed. For example, computing system 300 may be used where the operating system imposes interrupts to be static. Computing system 300 also may be used in operating systems where the interrupt offsets may be changed, and other situations such as when an operating system is not loaded.

Figure 4:
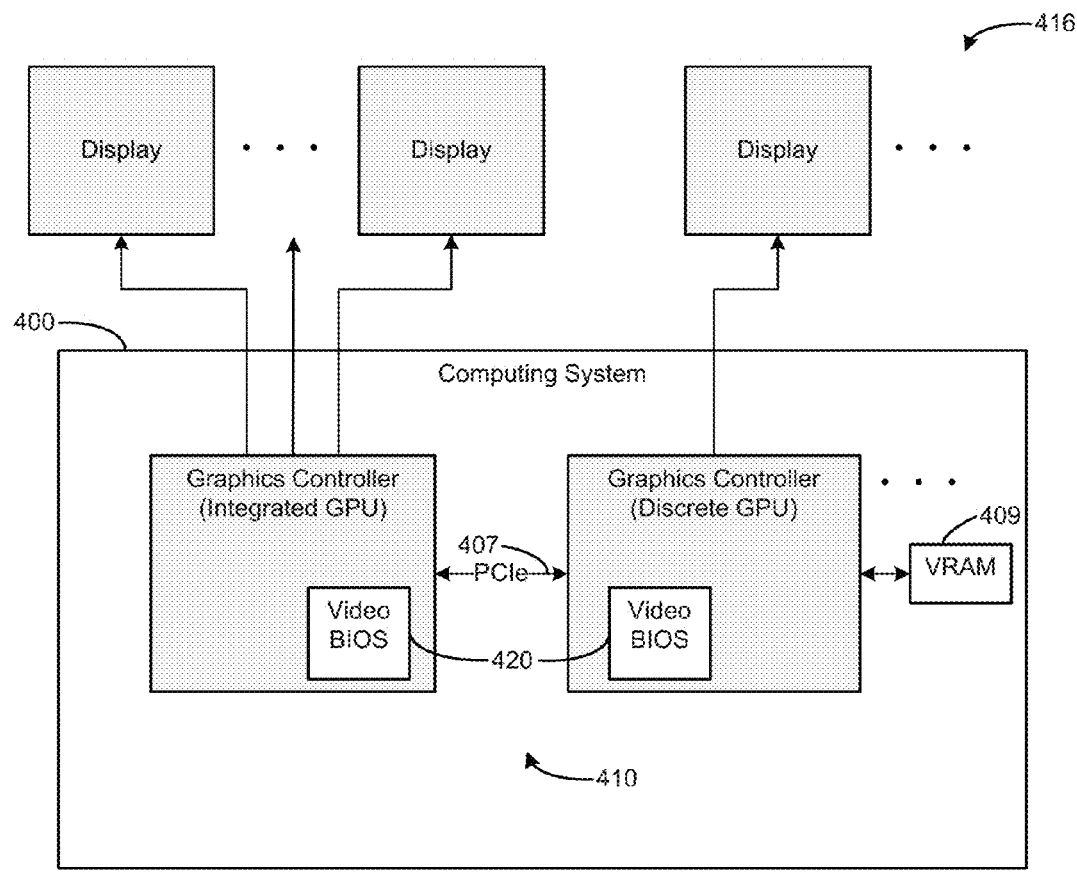
FIG. 4 is a block diagram of a computing system including a plurality of graphics controllers according to an example.

FIG. 4 is a block diagram of a computing system 400 including a plurality of graphics controllers 410 according to an example. The plurality of graphics controllers 410 are associated with a plurality of video BIOSes 420, and may communicate using an interconnect such as Peripheral Component Interconnect Express (PCIe) 407. A graphics controller may be associated with video random access memory (VRAM) 409 and/or other hardware (not shown). The plurality of graphics controllers 410 are to interface with a plurality of displays 416.

During power up, computing system 400 may dispatch the plurality of video BIOSes 420 corresponding to the plurality of graphics controllers 410. The dispatched video BIOSes 420, along with their corresponding interrupt offsets, may be saved to reserve memory. One video BIOS may be the "active" (e.g., selected) video BIOS residing in the standard/active video BIOS memory region (e.g., C0000; shadow memory region), with corresponding interrupt offset in the interrupt vector table, to handle requests for video BIOS services. The decision on which of the plurality of video BIOSes 420 is to be the active/selected video BIOS may be based on display status, and may be handled by the computing system (e.g., by system BIOS).

The plurality of displays 416 may be connected to the plurality of graphics controllers 410, and so a choice may be made as to which display(s) are to be enabled by selecting the corresponding graphics controller (one graphics controller/video BIOS may interact with multiple displays). The choice may be based on a policy decision in the computing system 400 (although other techniques, such as manual selection, pre-programmed priority lists, and others may be used). In an example, more than two displays may be connected to each graphics controller, so a policy decision may enable a desired display to be activated, even in the presence of multiple displays. The displays may include analog or digital, including displays based on Video Graphics Array (VGA), High-Definition Multimedia Interface (HDMI), DisplayPort (DP), Digital Visual Interface (DVI), Thunderbolt® (TB), and others. Each display interface of a graphics controller 410 may be associated with an ability to detect connection and/or disconnection, such as an electrical grounding level for analog, or a HPD signal for digital, and the like.

A selection policy may operate as follows in an example notebook computing system 400 having a plurality of graphics controllers 410 including an integrated GPU and discrete GPU. If a display status indicates that a DP display is connected to the discrete GPU, and the notebook computer's built-in display panel lid is closed, then the selected video BIOS is to correspond to the discrete GPU. If the display status indicates that the notebook computer's display panel lid is open, or no DP display is connected, then the active video BIOS is to correspond to the integrated GPU.

A graphics controller, a graphics controller output, and/or a display may be associated with a priority. For example, in a computing system having a built-in display panel and various connectable displays, priority may be assigned as follows for a first computing system: a Built-in Panel has highest priority, a DP/HDMI/DVI/TB has middle priority, and VGA has lowest priority. For a second computing system, priority may be assigned as follows: a Built-in Panel has highest priority, DP/HDMI/DVI has second highest priority, System DP has third highest priority, and VGA has lowest priority. Thus, when multiple displays are available on a system, the displays may be selected/activated based on highest priority among the available displays. The displays may be associated with the graphics controllers and associated video BIOSes, to thereby assign priority to selection of the active video BIOS (e.g., based on a mapping of connectable displays).

Priority may be optimized as best possible given design limitations. For example, hardware limitations of a computing system 400 may mean that VGA and System DP displays cannot be detected via a GPIO signal, and may use a ground signal detection or other technique for detection. A GPIO signal may be used to drive the display priority behavior set forth above. For example, priority may be selected by system BIOS, based on reading a GPIO status of a display state, and selecting the appropriate "active" video BIOS. GPIO9 is a general purpose interrupt, to interact with an interrupt chipset of the computing system 400 on behalf of hot-pluggable displays (HPDs), e.g., when a discrete GPU (dGPU) is off.

The following tables set forth example priority schemes for prioritizing which video BIOS to select and/or make active in response to display status. iGPU stands for integrated graphics processing unit (a first graphics controller), and dGPU stands for discrete graphics processing unite (a second graphics controller). The schemes may be expanded for additional graphics controllers and/or displays. L refers to HPD being asserted (e.g., at least one digital display is connected to the dGPU). H means no HPD (no digital display connected to dGPU).

TABLE 1

| Display Status | Active VBIOS | Comment |
|---|---|---|
| Lid Open | iGPU | Panel available |
| Lid Close AND GPIO9 Low | dGPU | Panel not available Dock DP/DVI, System DP or System TB available VGA do not care |
| All other conditions | iGPU | VGA may be available All other displays not available |

TABLE 2

| Display Status | Active VBIOS | Comment |
|---|---|---|
| Lid Open | iGPU | Panel available |
| Lid Close AND GPIO9 Low | dGPU | Panel not available Dock DP/DVI is available System DP and VGA are do not care |

TABLE 2-continued

| Display Status | Active VBIOS | Comment |
| --- | --- | --- |
| All other conditions | iGPU | System DP and VGA may be available<br>All other displays not available |

Thus, example computing systems using the priority schemes set forth above will be capable of routing some displays to the integrated GPU, while routing other displays to the Discrete GPU. Computing systems thereby may take advantage of the higher display capabilities of the Discrete GPU and increase the number of active displays available for use. When a computing system displays output when a display driver is unavailable, the computing system may provide helpful interaction with output to displays in a desirable and flexible manner.

Figure 5:
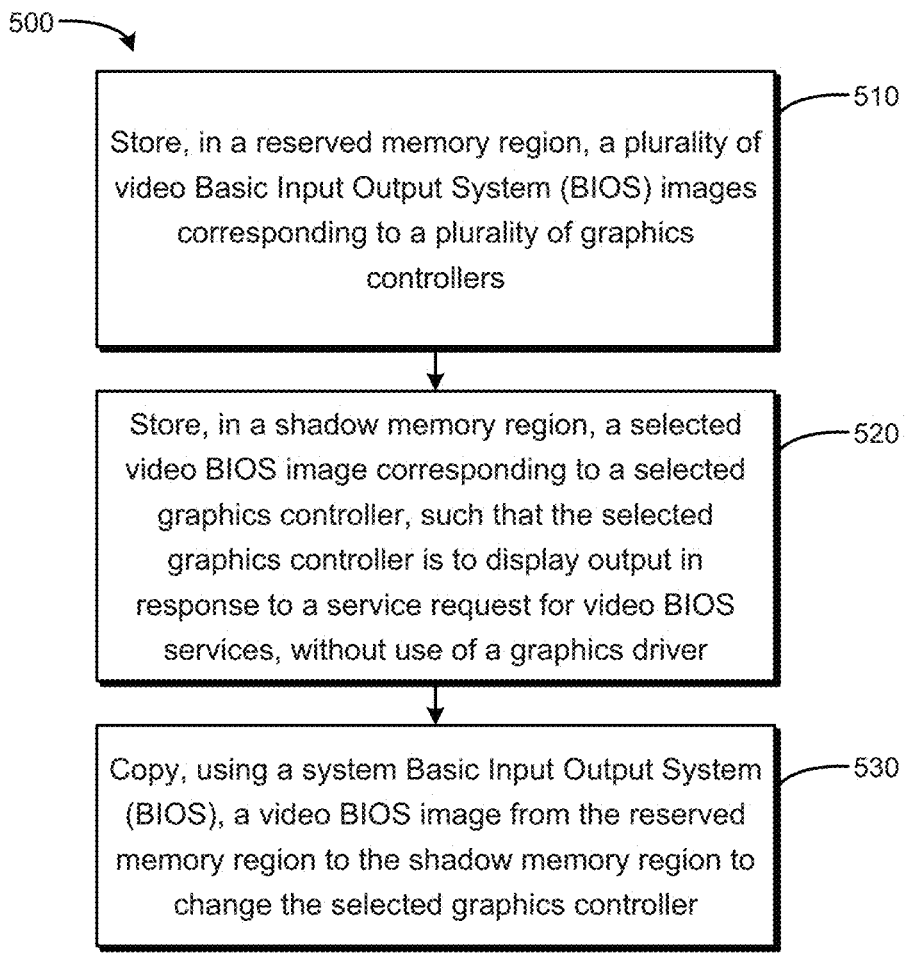
FIG. 5 is a flow chart based on storing a plurality of video BIOS images according to an example.

FIG. 5 is a flow chart 500 based on storing a plurality of video BIOS images according to an example. In block 510, a plurality of video Basic Input Output System (BIOS) images corresponding to a plurality of graphics controllers are stored in a reserved memory region. For example, a video BIOS may be dispatched to an active/shadow memory region and copied to the reserved memory region. This may be repeated for each of a plurality of video BIOSes corresponding to a plurality of graphics controllers. In block 520, a selected video BIOS image corresponding to a selected graphics controller is stored in a shadow memory region, such that the selected graphics controller is to display output in response to a service request for video BIOS services, without use of a graphics driver. For example, a computing system may dispatch the plurality of video BIOSes (in sequence and/or in parallel) such that the selected video BIOS is last to be dispatched, to remain active in the shadow memory region. In another example, a computing system may identify the selected video BIOS from among a plurality stored in the reserved memory region (e.g., responsive to a display status change), and then copy the selected video BIOS to the shadow memory region. An interrupt vector table may be updated such that the selected video BIOS is responsive to the service request for video BIOS services. In block 530, a video BIOS image is copied, using a system Basic Input Output System (BIOS), from the reserved memory region to the shadow memory region to change the selected graphics controller. For example, the copied video BIOS may overwrite an existing video BIOS occupying the shadow memory region. Also, the system BIOS may detect a display status change and identify a usable display for output on another graphics controller, and copy the corresponding video BIOS to the shadow memory region to use the other graphics controller when a display driver is not available.

Figure 6:
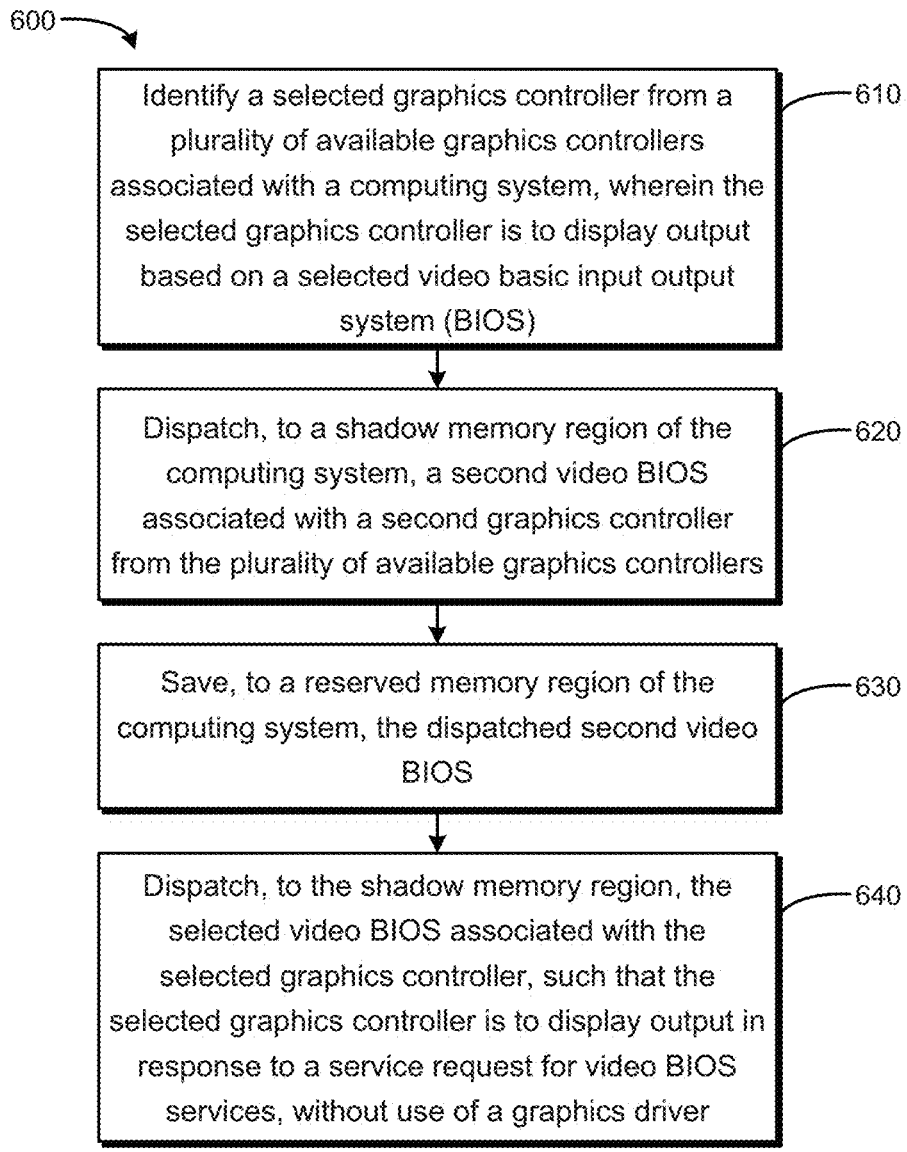
FIG. 6 is a flow chart based on dispatching a selected video BIOS according to an example.

FIG. 6 is a flow chart 600 based on dispatching a selected video BIOS according to an example. In block 610, a selected graphics controller is identified from a plurality of available graphics controllers associated with a computing system, wherein the selected graphics controller is to display output based on a selected video basic input output system (BIOS). For example, the graphics controller may be selected based on a display status, such as by using polling or interrupts to check for a change in display status. Even if multiple displays are connected to multiple graphics controllers, a graphics controller may be selected based on a priority scheme. In block 620, a second video BIOS associated with a second graphics controller from the plurality of available graphics controllers is dispatched to a shadow memory region of the computing system. For example, the computing system may uncompress and execute the second video BIOS, and may initialize the second graphics controller hardware and associated interrupts. In block 630, the dispatched second video BIOS is saved to a reserved memory region of the computing system. Thus, the second video BIOS saved to the reserved memory region has already gone through the dispatch process, such that it is uncompressed and ready for operations, along with its related operational parameters such as an interrupt offset. In block 640, the selected video BIOS associated with the selected graphics controller is dispatched to the shadow memory region, such that the selected graphics controller is to display output in response to a service request for video BIOS services, without use of a graphics driver. For example, the selected video BIOS may overwrite or otherwise displace the previously dispatched second video BIOS from the shadow memory region, based on the dispatching operation, without a need to copy the selected video BIOS into the shadow memory region (although in alternate examples, a dedicated copy operation may be used).

Figure 7:
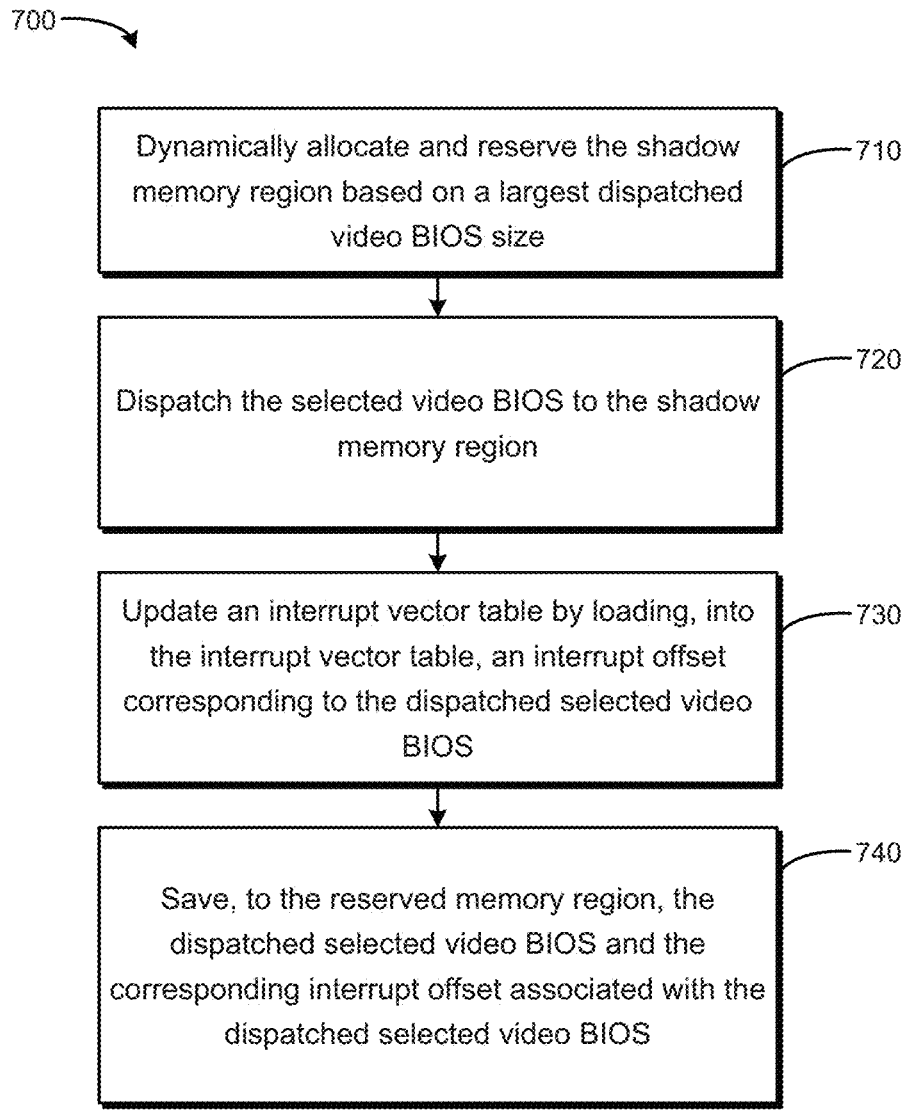
FIG. 7 is a flow chart based on dispatching a selected video BIOS according to an example.

FIG. 7 is a flow chart 700 based on dispatching a selected video BIOS according to an example. In block 710, the shadow memory region is dynamically allocated and reserved based on a largest dispatched video BIOS size. For example, if three video BIOSes are involved, a computing system may determine the dispatched video BIOS size for all three and identify the largest size. The shadow memory region may be allocated for that largest size, such that the shadow memory region may accommodate any of the dispatched video BIOSes, without a need to re-allocate when a selected video BIOS is swapped in/out of the shadow memory region. In block 720, the selected video BIOS is dispatched to the shadow memory region. The selected video BIOS may be accommodated because, in block 710, the shadow memory region has been allocated and sized accordingly. In block 730, an interrupt vector table is updated by loading, into the interrupt vector table, an interrupt offset corresponding to the dispatched selected video BIOS. For example, the interrupt vector table may be updated as part of the dispatching process, and/or the interrupt vector table may be updated by loading a copy of the interrupt offset into the interrupt vector table. In block 740, the dispatched selected video BIOS and the corresponding interrupt offset associated with the dispatched selected video BIOS are saved to the reserved memory region. Thus, the reserved memory region may contain a "ready-to-go" copy of the video BIOS and associated interrupt offset for a graphics controller, and this may be repeated for each of a plurality of graphics controllers and associated video BIOSes and interrupt offsets.

Figure 8:
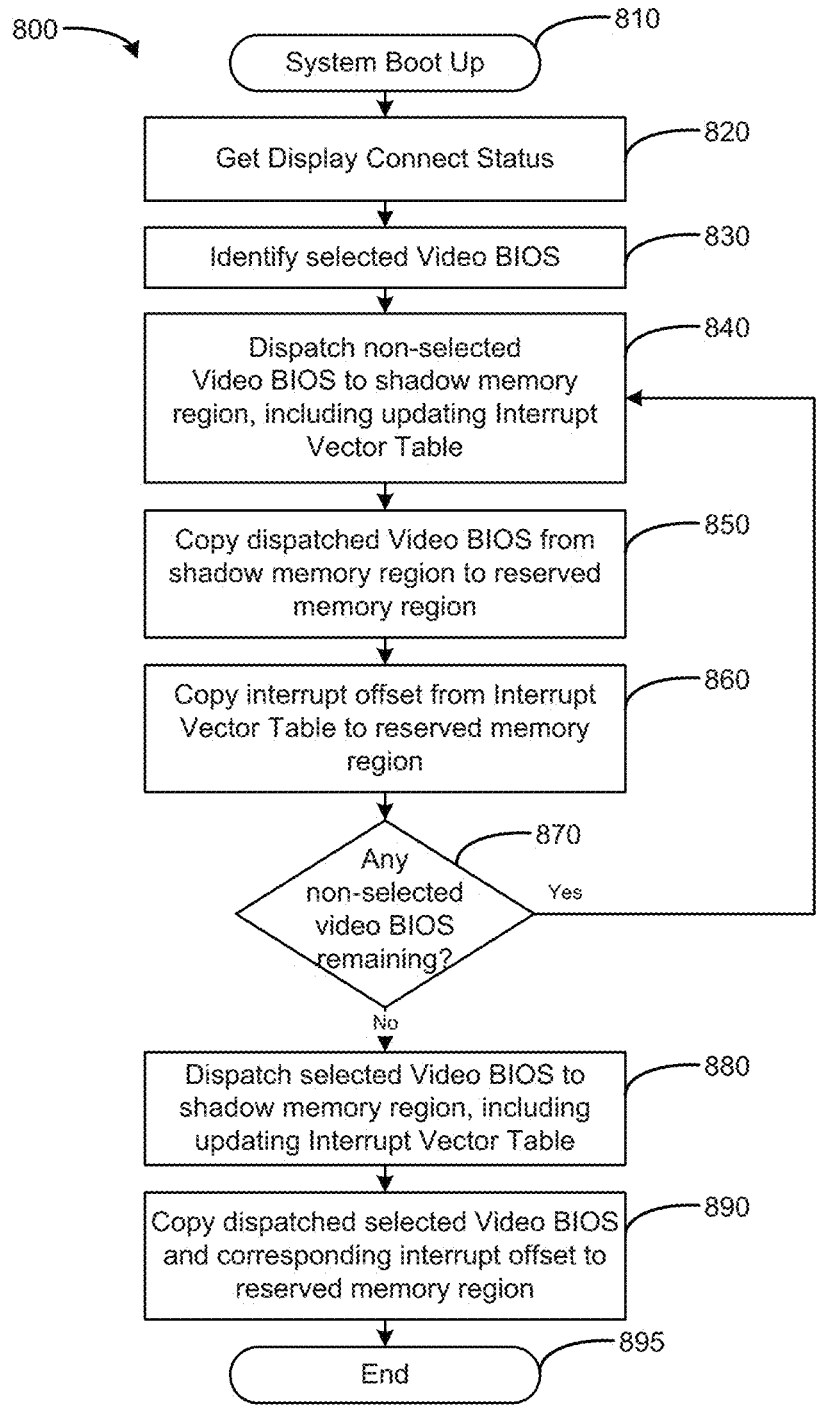
FIG. 8 is a flow chart based on dispatching a selected video BIOS responsive to system boot up according to an example.

FIG. 8 is a flow chart 800 based on dispatching a selected video BIOS responsive to system boot up according to an example. In block 810, the flow chart 800 begins with system boot up. In block 820, a display connect status is obtained. For example, a computing system may poll for connected displays, or receive an interrupt for disconnected and/or connected displays. The computing system may obtain display connect status for a plurality of graphics controllers and/or displays. In block 830, the selected video BIOS is identified. For example, the computing system may use a policy and/or priority scheme to select a video BIOS to provide output in response to service calls for video BIOS services (e.g., in the absence of a software video driver). In block 840, a non-selected video BIOS is dispatched to the shadow memory region, including updating the interrupt vector table. For example, the non-selected video BIOS may be uncompressed and executed to initialize the corresponding graphics controller. In block 850, the dispatched video BIOS is copied from the shadow memory region to the reserved memory region.

For example, the reserved memory region is to store a "ready-to-go" copy of the dispatched non-selected video BIOS. In block 860, an interrupt offset is copied from the interrupt vector table to the reserved memory region. For example, the interrupt offset corresponds to the currently dispatched video BIOS, which is copied to the reserved memory region per block 850. In block 870, it is determined whether any non-selected video BIOSes are remaining. For example, the computing system may identify a count of four graphics controllers that are present in the computing system, and decrement the count each time a corresponding video BIOS is dispatched, stopping when the count reaches one (accounting for the selected video BIOS). If a non-selected video BIOS remains, flow proceeds to block 840 to dispatch the remaining non-selected video BIOSes. If, at decision block 870, there are no remaining non-selected video BIOSes, flow proceeds to block 880. In block 880, a selected Video BIOS is dispatched to the shadow memory region, including updating the Interrupt Vector Table. For example, the computing system may operate by servicing interrupt service requests for video BIOS services based on the selected graphics controller and corresponding selected video BIOS, that are operable in the active/shadow memory region due to being dispatched and not displaced by subsequent dispatches. In block 890, the dispatched selected Video BIOS and corresponding interrupt offset are copied to the reserved memory region. Thus, a "ready-to-go" copy of the active/dispatched video BIOS also may be added to the reserved memory region, such that all of the video BIOSes are accounted for and on-call for activating by swapping into the shadow memory region. The flow chart 800 ends at block 895.

Figure 9:
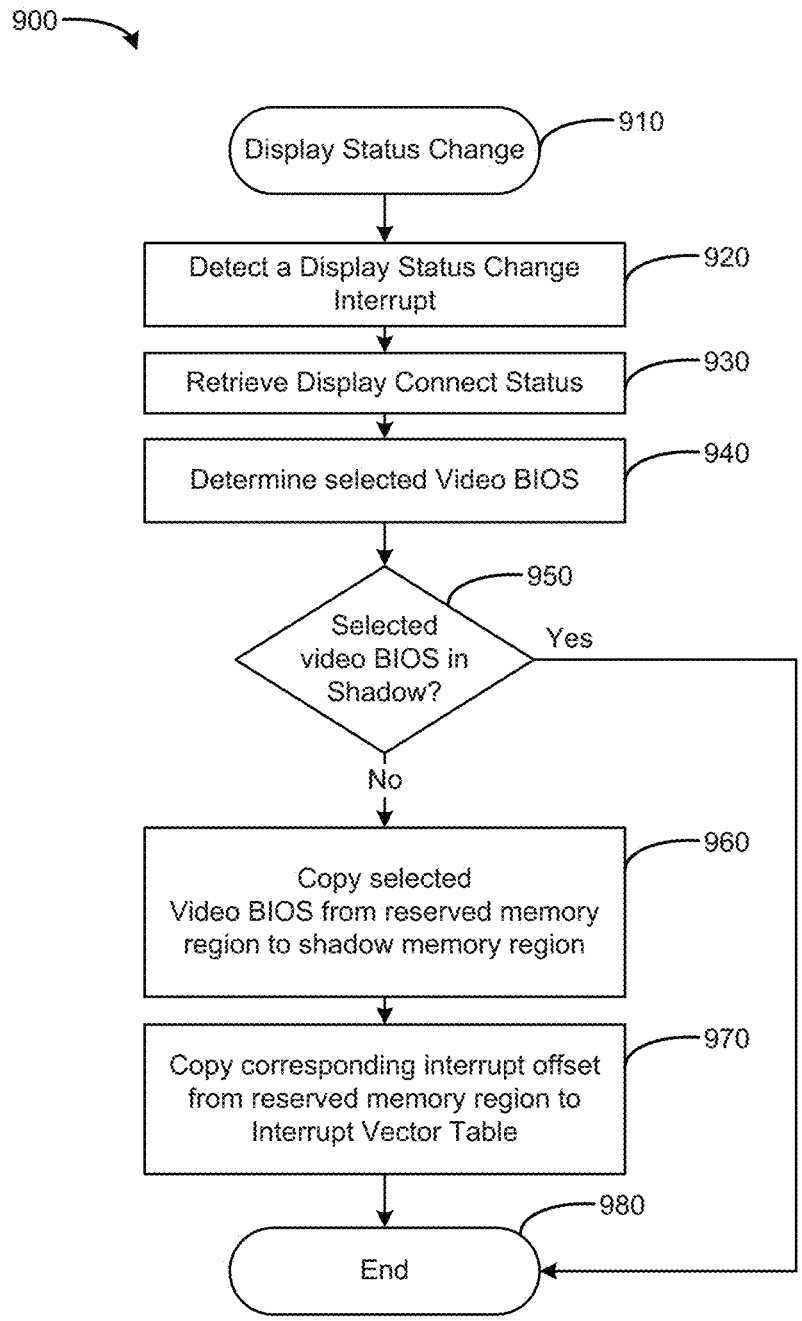
FIG. 9 is a flow chart based on copying a selected video BIOS responsive to display status change according to an example.

FIG. 9 is a flow chart 900 based on copying a selected video BIOS responsive to display status change according to an example. In block 910, the flow chart 900 begins with a display status change. For example, the computing system may already be operational (e.g., following a boot up), and a display is disconnected and/or connected (e.g., a notebook computer display lid is closed and/or an external display is connected). In block 920, a display status change interrupt is detected. For example, system BIOS of the computer system may receive an interrupt according to Not Plug Detection (HPD) protocols. In block 930, a display connect status is retrieved. For example, the computing system may identify which display(s) is/are connected to which graphics controller(s), which may be accomplished through hardware checks. In block 940, a selected video BIOS is determined. For example, the computing system may use a selection policy, priority scheme, preconfiguration, or other technique for determining which video BIOS to select for display output. In block 950, it is determined whether the selected video BIOS is in a shadow memory region. For example, the computing system may identify whether the shadow memory region contains an active video BIOS, and if so, whether the active/stored video BIOS corresponds to the selected video BIOS. If yes, flow ends at block 980. If no, flow proceeds to block 960. In block 960, the selected video BIOS is copied from the reserved memory region to the shadow memory region. The selected video BIOS may already be present in the reserved memory region for copying to the shadow memory region. In an example, the computing system may dispatch the selected video BIOS in order to copy it to the shadow memory region. In block 970, the corresponding interrupt offset is copied from the reserved memory region to an interrupt vector table. For example, similarly to how the selected video BIOS is copied from the reserved memory region, the interrupt vector table may be updated by copying from the reserved memory region, and in alternate examples, may be updated by dispatching the selected video BIOS. Flow ends at block 980.

Those of skill in the art would appreciate that the various illustrative components, modules, and steps described in connection with the examples disclosed herein may be implemented as electronic hardware, computer software, or combinations of both. Thus, the example steps of FIGS. 5-9 may be implemented using software modules, hardware modules or components, or a combination of software and hardware modules or components. In another example, one or more of the steps of FIGS. 5-9 may comprise software code stored on a computer readable storage medium, which is executable by a processor. As used herein, the indefinite articles "a" and/or "an" can indicate one or more than one of the named object. Thus, for example, "a processor" can include one or more than one processor, such as in a multi-core processor, cluster, or parallel processing arrangement. The processor may be any combination of hardware and software that executes or interprets instructions, data transactions, codes, or signals. For example, the processor may be a microprocessor, an Application-Specific Integrated Circuit ("ASIC"), a distributed processor such as a cluster or network of processors or computing device, or a virtual machine. The processor may be coupled to memory resources, such as, for example, volatile and/or non-volatile memory for executing instructions stored in a tangible non-transitory medium. The non-transitory machine-readable storage medium can include volatile and/or non-volatile memory such as a random access memory ("RAM"), magnetic memory such as a hard disk, floppy disk, and/or tape memory, a solid state drive ("SSD"), flash memory, phase change memory, and so on. The computer-readable medium may have computer-readable instructions stored thereon that are executed by the processor to implement the various examples according to the present disclosure.

What is claimed is:

1. A computing system comprising:
   a plurality of graphics controllers;
   a reserved memory region to store a plurality of video Basic Input Output System (BIOS) images;
   a shadow memory region to store a selected video BIOS image corresponding to a selected graphics controller, such that the selected graphics controller is to display output in response to a service request for video BIOS services, without use of a graphics driver; and
   a system Basic Input Output System (BIOS) to enable changing the selected graphics controller, based on copying a video BIOS image of the plurality of video BIOS images from the reserved memory region to the shadow memory region.

2. The computing system of claim 1, further comprising an interrupt vector table, wherein the reserved memory region is to store a plurality of interrupt offsets corresponding respectively to the plurality of video BIOS images, and the system BIOS is to enable changing the selected graphics controller based on copying a corresponding interrupt offset from the reserved memory region to the interrupt vector table, such that the selected graphics controller is responsive to an interrupt service request for video BIOS services.

3. The computing system of claim 1, further comprising an interrupt vector table pointing to a selected video BIOS offset in system memory that points to a selected video BIOS, wherein the reserved memory region is to store a plurality of interrupt offsets corresponding respectively to the plurality of video BIOS images, and the system BIOS is to enable changing the selected graphics controller based on copying a corresponding interrupt offset from the reserved memory region to the selected video BIOS offset, such that the selected graphics controller is responsive to an interrupt service request for video BIOS services.

4. The computing system of claim 1, wherein, upon boot up of the computing system, the system BIOS is to dispatch, into the shadow memory region, and copy, to the reserved memory region, each of the plurality of video BIOS images.

5. The computing system of claim 1, wherein, upon boot up of the computing system, the system BIOS is to dispatch, into the shadow memory region, and copy, to the reserved memory region, the selected video BIOS image after dispatching and copying the plurality of video BIOS images for non-selected graphics controllers.

6. The computing system of claim 1, wherein, upon a change to a display connection status of the computing system, the system BIOS is to identify a displayable graphics controller from the plurality of graphics controllers, and copy a corresponding video BIOS image into the shadow memory region.

7. The computing system of claim 1, wherein the selected graphics controller is to display output in response to an INT10 interrupt service request.

8. The computing system of claim 1, wherein the shadow memory region is associated with a C0000 memory location.

9. A method, comprising:
identifying a first graphics controller selected from a plurality of available graphics controllers associated with a computing system, wherein the selected first graphics controller is to display output based on a selected first video basic input output system (BIOS);
dispatching, to a shadow memory region of the computing system, a second video BIOS associated with a second graphics controller from the plurality of available graphics controllers;
saving, to a reserved memory region of the computing system, the dispatched second video BIOS;
dispatching, to the shadow memory region, the selected first video BIOS associated with the selected first graphics controller, such that the selected first graphics controller is to display output in response to a service request for video BIOS services, without use of a graphics driver.

10. The method of claim 9, further comprising saving, to the reserved memory region, the dispatched selected first video BIOS and a selected first interrupt offset associated with the dispatched selected first video BIOS.

11. The method of claim 9, wherein dispatching the selected first video BIOS further comprises updating an interrupt vector table by loading, into the interrupt vector table, an interrupt offset corresponding to the dispatched selected first video BIOS.

12. The method of claim 9, further comprise dynamically allocating and reserving the shadow memory region based on a largest dispatched video BIOS size.

13. A non-transitory machine-readable storage medium encoded with instructions executable by a computing system that, when executed, cause the computing system to:
store, in a reserved memory region, a plurality of video Basic Input Output System (BIOS) images corresponding to a plurality of graphics controllers;
store, in a shadow memory region, a selected video BIOS image corresponding to a selected graphics controller, such that the selected graphics controller is to display output in response to a service request for video BIOS services, without use of a graphics driver; and
copy, using a system Basic Input Output System (BIOS), a video BIOS image of the plurality of video BIOS images from the reserved memory region to the shadow memory region to change the selected graphics controller.

14. The non-transitory machine-readable storage medium of claim 13, further comprising instructions that cause the computing system to read a state of connected displays to identify the selected graphics controller, based on at least one of: a General Purpose Input/Output (GPIO) to indicate a display connect status via a Hot Plug Detection (HPD) for digital displays, a lid state for an internal display panel, a GPIO attached to cable ground for a VGA display, and internal graphics controller registers that represent display connect status.

15. The non-transitory machine-readable storage medium of claim 13, further comprising instructions that cause the computing system to identify the selected graphics controller based on a priority associated with a display connected to the selected graphics controller.

* * * * *